Patent 3,404,914

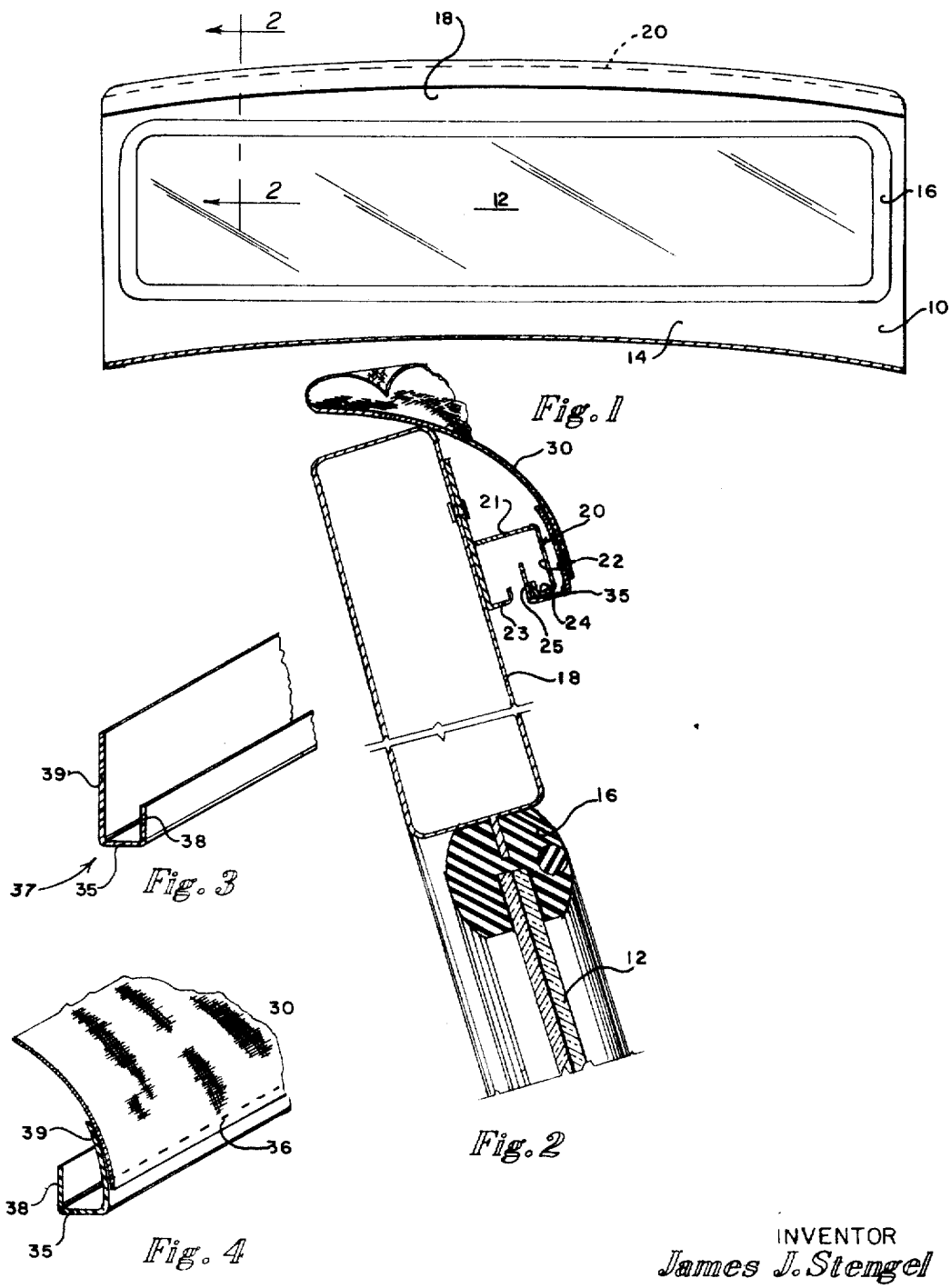

3,404,914
VEHICLE CONVERTIBLE TOPS
James J. Stengel, P.O. Box 318,
Boulder, Colo. 80301
Filed Sept. 6, 1966, Ser. No. 577,351
4 Claims. (Cl. 296—120)

ABSTRACT OF THE DISCLOSURE

A convertible top for utility-type vehicles, having an inverted metal channel secured to the top frame member of a windshield, includes a plastic channel having one long leg secured along the front edge of the top, whereby the shorter leg fits into and conforms to the curvature of the metal channel.

---

This invention relates to improvements in convertible tops for vehicles, and more particularly to improvements in cloth, convertible tops for Jeep-type vehicles.

Many four-wheel drive, utility vehicles are arranged with removable cloth tops, conventionally called convertible tops, so that the vehicle may be used without a top in cross-country jaunts, and many such vehicles have forward folding windshields for use in low brush country. The top is, of course, useful for protection against the elements, but in normal cross-country usage in reasonably good weather the top is not used. It not infrequently happens that sudden storms make it desirable to put the top on in a hurry. The tops used on such vehicles are not of the fold-down variety, as are found on conventional convertibles, and such tops are not of the power-driven type for raising and lowering. The tops for such four-wheel cross-country vehicles are conventionally completely removable and must be physically attached at several points to the vehicle, and then erected or made taut by means of a bow rod. With the conventional vehicle of this type, the top is initially attached to the top of the erected windshield and the side portions and the back are then attached to the vehicle by means of turn fasteners and the like. The loose but connected top is then made taut by erecting a bow rod which generally forms the rear upper corner of the top.

Most such utility four-wheel drive vehicles, particularly the "Jeep," have a channel attached to the top of the windshield frame, with the opening of the channel pointed downwardly. The convertible top is attached to the channel, to secure it in position overhead of the compartment of the vehicle. The normal method of attachment of the top to the channel is particularly difficult and requires considerable time for the assembly. On some vehicles the channel is not straight, but is bowed upwardly and the opening is formed by two short flanges on the legs of the channel. Conventionally, two methods of attachment of the top to the channel have been used. The first method is to provide the top with a sewn pocket in the front edge. This pocket is stuffed up into the channel and a metal rod is then threaded through that portion of the pocket which is in the channel to secure the top in the channel. The second method is to provide a pocket in the edge of the cloth with a metal flat rod sewn in the pocket. The pocket and rod of the top may be threaded into the channel from one end, or may be pushed into the channel through the opening, relying on tautness to hold the rod in the channel. Either assembly is, of course, time consuming and in a sudden downpour the occupants of the vehicle may be thoroughly soaked before the front edge of the top is secured to the windshield. Subsequent erection of the top is, however, achieved rather quickly.

According to the present invention I have provided an improved method of attachment of a convertible cloth top to a four-wheel drive utility vehicle, which has a channel on the windshield frame. The invention includes the securing of a flexible channel member to the front edge of the cloth of a convertible top. The channel is arranged to engage the channel affixed to the frame of the vehicle, providing a quick, secure attachment of the top to the vehicle without threading the cloth or holding appendages to the vehicle channel. When the top is taut, the invention provides a secure attachment which is waterproof.

Included among the objects and advantages of the invention is an improved means for quickly and easily securing the front edge of a convertible top to a windshield of a four-wheel drive utility type vehicle.

Another object of the invention is to provide a temporary but secure attachment of a convertible top to a bowed channel at the top of a vehicle to the front edge attachment of a removable top to the vehicle.

These and other objects and advantages of the invention may be readily ascertained by referring to the following description and appended illustrations in which:

FIG. 1 is a front plan view of the windshield of a four-wheel drive utility vehicle, illustrating the mounting of a convertible top thereon;

FIG. 2 is an enlarged detailed view of an attachment between a cloth top and the holding channel of the windshield according to the invention;

FIG. 3 is a perspective view in detail of a portion of the flexible channel which is arranged to be attached to the cloth top of the vehicle; and FIG. 4 is a perspective view of a portion of the channel with the top attached thereto.

In the device selected for the illustrations, a vehicle windshield frame 10 has a windshield 12 mounted therein. The lower part of the windshield 14 is arranged for attachment to the vehicle body (not shown), and the frame may be foldable, that is, mounted on pivots so that it folds down over the hood of the radiator. The glass windshield is normally held in the frame by means of a rubber grommet 16 which permits easy placement or removal. As shown in FIG. 2, the upper frame includes a hollow member 18 having secured thereto a channel 20 which is arcuate, following the contour of the frame. The channel 20 is welded, riveted or otherwise secured to the frame for a generally leakproof connection with the frame and to be securely held thereby. The channel includes an upper web 21, an outer leg 22, and inwardly turned flanges 23 and 24, leaving an opening 25. The inner ends of the flanges 23 and 24 are turned inwardly to provide a narrow opening 25 having smooth edges.

The front edge of the cloth of the top 30, which may be canvas, nylon, or the like, has secured to it a synthetic plastic channel 37, FIG. 3. As shown in FIG. 4, the cloth 30 is sewn through the somewhat flexible channel by means of stitches 36 which extend along the full extent of the channel and the cloth. One or more rows of stitching may be used to secure the cloth to the channel. The channel may be double-stitched where desired and, also, where desired rivets may be placed along the edge to provide a secure joint between the two members. The channel 37 includes a web 35, a front leg 38 and a rear leg 39 which is substantially longer than the front leg. In one form the back leg is approximately two times as long as the front leg 38. The longer back leg provides means for securely attaching the cloth by means of the stitching, rivets or the like. In a preferred form, the channel 37 is a synthetic plastic member which is somewhat rigid but has sufficient flexibility that it acquires the arcuate configuration of the channel 20 attached to the windshield frame when the top is pulled taut. The arcuate upper part of the windshield and the channel is, of course, to bow the vehicle roof laterally so that moisture will not accumulate on the cloth top but will run off the sides. The middle of the bow is some two or more inches above the ends to provide a satisfactory arc for removal of water from the top. The plastic channel may be made of such materials as nylon, polyesters, various types of polyvinyl resins, cellulose butyrate, neoprene, and the like, with sufficient plasticizer to permit a certain deformation of the plastic, but still will retain its essentially stiff characteristics so that it acts like a hook, hooking into the channel attached to the windshield, and the channel will be of sufficient strength to hold the top under the stresses subjected to it by cloth shrinking, wind and the like. A channel, by virtue of its geometry, has longitudinal rigidity, but the plastic channel has sufficient longitudinal flexibility to conform to the bowed channel on the windshield.

The cross-sectional dimensions of the plastic channel should not be substantially greater than the dimensions of the metal channel attached to the windshield of the vehicle so that a tight connection may be formed therebetween to prevent moisture from being blown up under the top under driving conditions. Under the conditions of installation, the short leg of the plastic channel is pulled tightly against the flange 24 of the opening of the channel, forming a tight seal therewith. The tautness of the top keeps the plastic channel tightly against the metal channel all across the windshield from edge to edge, and makes the plastic channel arcuate to conform with the bow of the metal channel.

For installing the top on a vehicle, the top is removed from its stowage, draped over the passenger compartment of the vehicle, and the channel on the front edge hooked under the channel on the windshield. The sides of the top are then secured to the vehicle in conventional manner and the bow rod is erected to pull the top taut, which, also, pulls the plastic channel into conformity with the metal channel on the windshield. Removal of the top is reversed, releasing the tension on the top by releasing the bow rod and the plastic channel may be simply removed from the metal channel.

As explained above, one method of affixing the top to the channel is to sew it on. Much of the top fabric being used is plastic coated, a vinyl being commonly used. The plastic channel may be welded to the top fabric as by heat sealing or fusing or by solvents. Of course, rivets or the like may, also, be used to attach the channel to the top fabric.

While the invention has been illustrated by reference to particular embodiments, there is no intent to limit the spirit or the scope to the precise details so set forth except as defined in the following claims.

I claim:

1. In a convertible or removable cloth top for a Jeep-type utility vehicle having an arcuate metal channel including a downwardly directed opening extending across the top of the windshield of the vehicle, the improvement of securing a longitudinally flexible channel member which is substantially the width of the windshield on which it is to be used to the front edge of the cloth top, said flexible channel being sufficiently flexible to conform to the curvature of said arcuate metal channel, said channel having a web arranged to seat tightly against the forward edge of the downwardly directed opening of the windshield channel; a first flange normal to said web and depending from one edge of said web and arranged to fit in the opening of the windshield channel with a hooking action to temporarily secure said flexible channel member in said windshield channel and form a seal therewith; a second flange depending from said web from the opposite edge thereof and extending in the same direction as said first flange and said second flange being wider than said first flange; and the forward edge of the removable cloth being secured to said second flange.

2. The convertible or removable cloth top according to claim 1 wherein said flexible channel is a synthetic plastic.

3. The convertible or removable cloth top according to claim 1 wherein said second flange is approximately twice as wide as said first flange.

4. The convertible or removable cloth top according to claim 1 wherein said cloth top is sewn to said second flange.

References Cited

UNITED STATES PATENTS 3,175,269    3/1965    Raduns et al. _____ 24—265

FOREIGN PATENTS 843,637    8/1960    Great Britain.

BENJAMIN HERSH, *Primary Examiner.*

R. SONG, *Assistant Examiner.*